US006766352B1

(12) United States Patent
McBrearty et al.

(10) Patent No.: US 6,766,352 B1
(45) Date of Patent: Jul. 20, 2004

(54) INDICATOR TO SHOW THAT A CACHED FILE IS BEING DISPLAYED ON A CLIENT SYSTEM

(75) Inventors: Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,817

(22) Filed: May 4, 2000

(51) Int. Cl.[7] .............................................. G06F 15/16
(52) U.S. Cl. ........................ 709/203; 709/203; 709/216; 709/217
(58) Field of Search ................................. 709/203, 223, 709/217, 214, 215, 216; 345/854; 715/501.1

(56) References Cited

U.S. PATENT DOCUMENTS 5,801,702 A * 9/1998 Dolan et al. ................. 345/854
5,870,769 A * 2/1999 Freund ....................... 715/501.1
6,182,133 B1 * 1/2001 Horvitz ....................... 709/223

* cited by examiner

Primary Examiner—Ario Etienne
Assistant Examiner—Sahera Halim
(74) Attorney, Agent, or Firm—Volel Emile; Diana L. Roberts; Dillon & Yudell LLP (57) ABSTRACT

A modified client application within a network for use in accessing and displaying cached files. The modified client application has access to a client cache in which a copy of files downloaded from the network server is stored. When a particular file is requested, logic components within the client application determine if the requested file is resident in the client cache. If the requested file is resident in the client cache, the file is displayed within the graphical user interface (GUI) of the requesting application along with an indicator by which the user is notified that the displayed file is a cached file. Different indicator types are possible, including a cache message button which is displayed within the application GUI, and a color coded scheme which causes the file or fileile border to be displayed in a different color whenever the displayed file is cached.

21 Claims, 7 Drawing Sheets

INDICATOR TO SHOW THAT A CACHED FILE IS BEING DISPLAYED ON A CLIENT SYSTEM

RELATED APPLICATIONS

The present invention is related to the subject matter of the following commonly assigned, co-pending U.S. patent application Ser. No. 09/564,815 entitled "Indicator to Show That A Cached Web Page is Being Displayed" filed concurrently herewith.

BACKGROUND OF THE INVENTION

1. Technical Field

The present invention relates in general to displaying stored files and in particular to the caching and displaying of files on a client system of a network. Still more particularly, the present invention relates to a method and system for identifying to a user when files being displayed on a client system of a network are cached files.

2. Description of the Related Art

Local Area Networks (LAN) are known in the computer industry. The need for newer and more versatile applications of LAN systems has led to the development of computerized distributed information resources, such as the "Intranet." Another improvement has been the development of shared-distributed systems, which allow simultaneous access to and editing of a single server-based document or file by multiple users. As the traditional workplace evolves and becomes more geographically dispersed, individuals working on a single project may be based at different locations within a company and complete projects via a shared-distributed network. There is thus a developing need for improved shared-distributed networks.

Shared-distributed networks are based on client-server software architectures. These architectures provide a versatile infrastructure that supports shared access to server resources, such as filesystems. A client is a requester of services, and a server is the provider of services. A single machine can be both a client and a server depending on the software configuration. A client machine is loaded with client software, while a server machine is loaded with server software.

The information provided by a server can be in the form of programs which run locally on a given client terminal, or in the form of data, such as files, that may be used by other programs. In shared-distributed netorks, when files are retrieved by a client from a server, the client often caches the file temporarily within its local storage area (i.e., memory or cache).

Caching is a generic term meaning "to store." It typically is completed to avert network traffic. As applied to the shared-distributed network, "caching" means "the copying of a file, made incidental to the first access to the file, and storage of that copy for that purpose of speeding subsequent access." Thus, a copy of a file previously retrieved off the Intranet is locally stored. The caching of files allows a user to repeatedly view the file within a short span of time without having to retrieve the file from the server each time. Caching thus allows for faster reloading of the file or document at the client.

Presently, when a client requests a file, the client will first check to see if the file requested already resides in the client's cache. If the client's cache has a copy of the requested file, then the file is loaded from the client's cache. If the data is not in the cache, the client fetches the file from the server. The fetched file is provided to the client, where it is stored in the cache. Providing a client with a cached copy of a file occurs quickly because the process of loading the file requires reduced network activity. Thus, caching reduces the computational load on the server.

Since each client in a distributed system has a copy of and may edit the file, any client may update the server copy of the file. Alternatively, the network system's manager may make changes to a file. Thus, an updated version (version 2) of the file may exist on the server while an older version (version 1) exist on the clients until the client reloads the file from the server. When a client, which has an older version of the file stored on its cache loads the file, the cached version of the file is retrieved (i.e., the older version and not the newer version located on the server).

Thus, one of the drawbacks with the present method of displaying cached files on a client is that in dynamic systems, the cached information may at times be old or stale. With distributed systems, for example, a problem exists with the use of cache data by a client. Distributed clients may require the most current version of a particular file being shared by other clients. When the client receives cached files, which are not current (i.e., the content of the file on the server has been changed since the cached copy of the file was stored) the user may be interacting with outdated information.

In a complex interactive process, displaying of different versions of a file to different clients may pose a significant problems. In some instances, it is important to have the newest version of the file from the server on display; however, there are times when the user does not require the newest version or really prefers to have an older version of the file. The latter case may occur because the user does not wish to waste time waiting for the newer version to download, particularly when the information present in the older version is sufficient.

Current caching technology is hidden and most users are unaware when the file being displayed is a cached copy. Some files may contain a time/date stamp; however in most cases, the software/application is set to automatically update the time/date each time the file is accessed giving the user the perception that the file has just been retrieved. Thus, the time/date stamp is an unreliable indicator about the status of the file being retrieved. Currently, a user receives no indication as to whether the file being displayed is the most current version, or the user is forced to wait while the request is sent to the server even when a cached copy of the file would be appropriate.

The present invention recognizes that it would therefore be desirable to have a method and system for indicating to a user whether a retrieved file displayed on a client is a cached file or newly downloaded file. A method and system which allow a user to determine the current status of the displayed file would be a welcomed improvement.

SUMMARY OF THE INVENTION

The foregoing objects are achieved as is now described. A modified client within a network for use in accessing and displaying cached files is disclosed. The modified client has a client application and a cache (or memory) which caches a copy of a file downloaded from the network server. When a particular file is requested, logic components within the client application determine if the requested file is resident in the cache. If the requested file is resident in the cache, the file is displayed within a graphical user interface (GUI) of the client application along with an indicator by which the user is notified that the retrieved file being displayed is a cached file. In one embodiment, the indicator is a cache message button which is displayed within the application GUI. In another embodiment, the indicator is a color coded scheme which causes the file or file border to be displayed in a different color whenever the particular page is cached. In a third embodiment, the indicator is presented as an interactive dialog box having instructions to the user to select a refresh option if display of the cached paged is not desired.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to a method, system, and client application within a network environment which provides a user of an application window with an indication of whether a requested file being displayed is a cached file (i.e., a copy loaded from the client's local cache and not from the network server). In particular, a software application of the present invention receives a request to display a file. The application searches for the file within its connected client cache, and when the file is found, retrieves the file from the local cache. The application further displays the filed along with an indicator, which informs the user that a cached version of the file (i.e., not a server copy) was retrieved.

Figure 1:
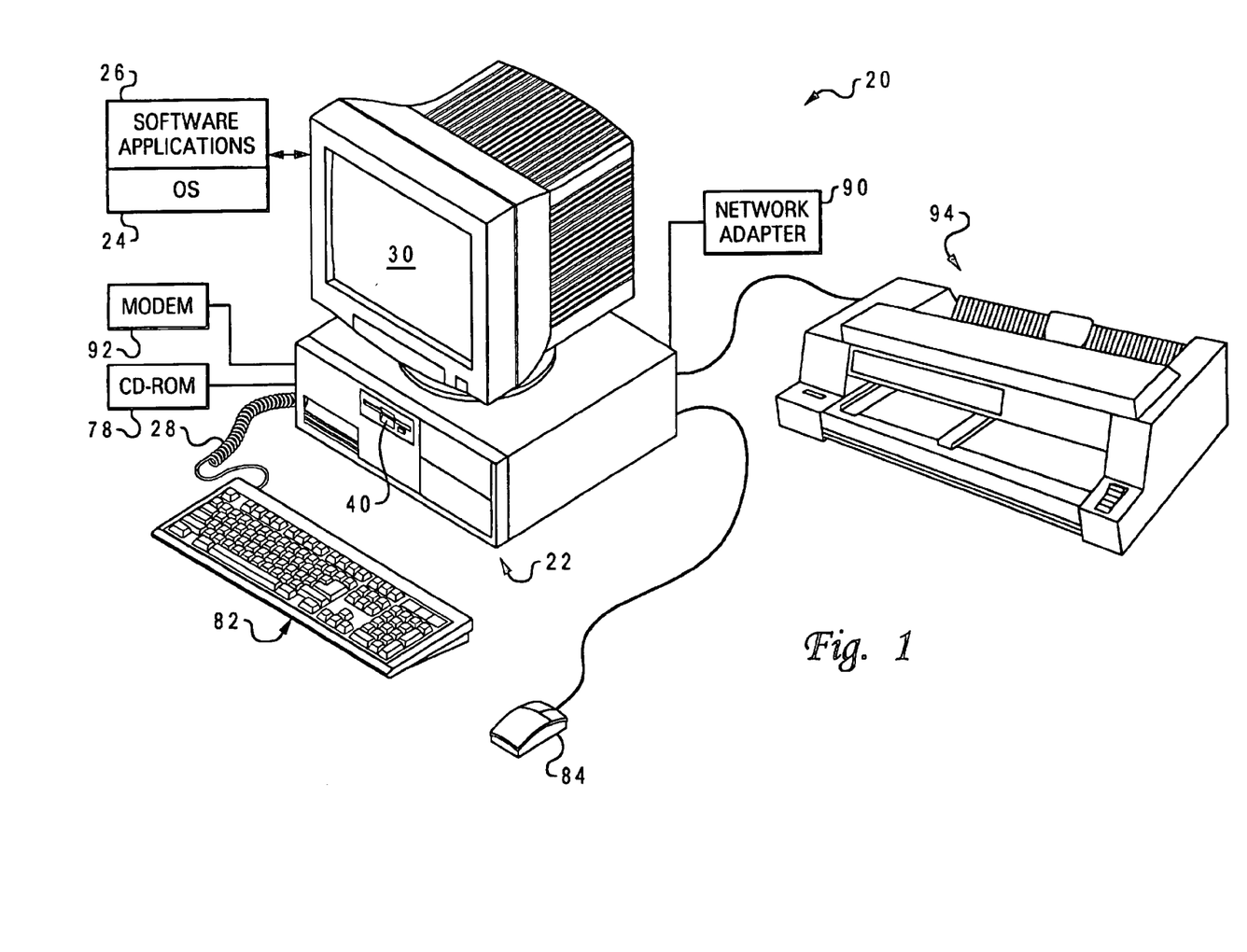
FIG. 1 depicts a data processing system, in which a preferred embodiment of the present invention may be implemented.
Figure 2:
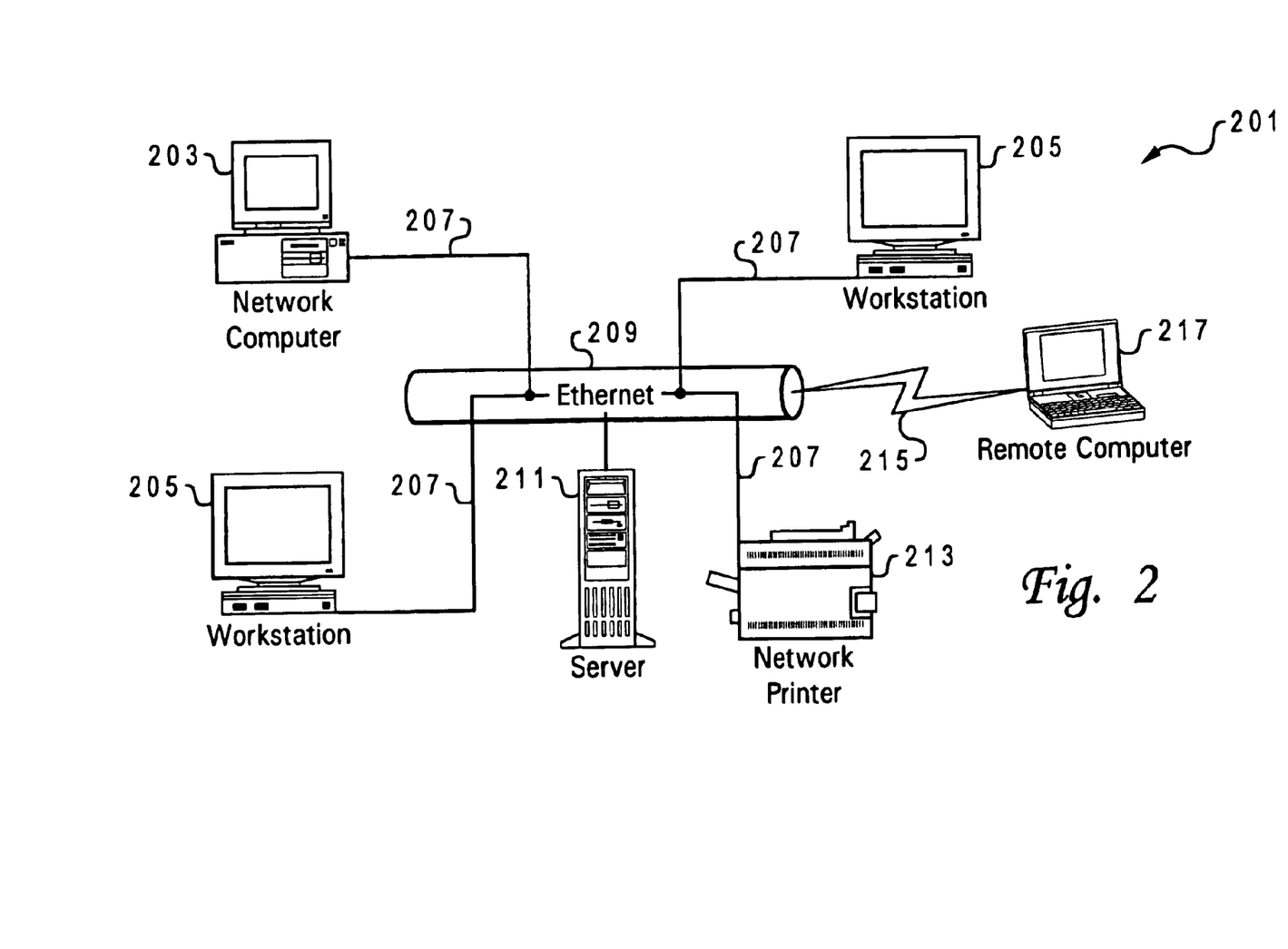
FIG. 2 is a high-level block diagram of a server-client based local area network (LAN) (or Intranet) in accordance with a preferred embodiment of the present invention.

The invention is illustrated being implemented in the data processing system and network as illustrated in FIGS. 1 and 2. The invention may, however, be implemented in other types of data processing systems and networks so, while the present invention may be described with reference to these figures, the reference should not be construed in a limiting sense.

For the purposes of this invention, the term client is utilized to refer to both the hardware component which is connected to a network server and the software applications stored in memory and being run on the hardware component. Also, the term user and client are utilized interchangeably or together. User refers primarily to an individual who utilizes the client. Further, the invention applies to loading and retrieving of documents, files, applications, data, etc. which may be changed on the server after being copied on a client system. For clarity and simplicity, the invention will be describe in terms of loading, retrieving and displaying of files, but this single reference is in no way meant to be limiting on the scope of the invention.

With reference now to the figures and in particular with reference to FIG. 1, a data processing system that may be utilized as a standalone data processing system or one of the client terminals or servers on a network is presented. Data processing system 20 comprises a Central Processing Unit (CPU) housed in a system unit 22. System unit 22 also provides connections for various hardware components including disk drives 40, and memory devices (not shown). Stored within memory devices are the operating system (OS) and software applications by which many of the processes of the invention are implemented as will become clear later. Several Peripheral input/output devices are connected to the CPU. These input/output devices include keyboard 82, mouse 84, printer 94, CD ROM 78, and display monitor 30. Display monitor 30 provides a graphical user interface (GUI) which allows a user to view and interact with software applications 26 stored in system memory or provided via a network, by displaying icons or other selectable mechanisms with which the user may interact.

Also coupled to CPU are various external devices, including modem 92, and network adapter 90, utilized for connecting data processing system 20 to other systems and/or networks, as is illustrated in FIG. 2. CD rom 78, modem 92, and network adapter 90 are depicted as external components; however those skilled in the arts are familiar with the various designs of data processing system architecture and understand that these components may be housed inside of system unit 22.

Modem 92 is a communication device that enables a computer to transmit information over standard telephone lines or wireless connections such as cellular. Modem 92 converts digital computer signals to interlock signals suitable for communications over these telephone media. Modem 92 can be utilized to connect data processing system 20 to a server via remote access protocols. Modem 92 may also provide a connection to other sources, such as an electronic bulletin board (BBS) or the World Wide Web.

Network adapter 90 may be used to connect data processing system 20 to a Local Area Network (LAN) as depicted in FIG. 2. For the purposes of the invention, use of a LAN is understood to also refer to an Intranet which provides different access methods but is essentially similar in its functionality, as those skilled in the art are aware. LAN may consist of a single server or a number of servers and provides network clients with a means of communicating and transferring software and information electronically within the network environment. Additionally, LAN may provide distributed processing, which involves several client computers in the sharing of workloads or cooperative efforts in performing a task.

Computer system 20 also preferably includes an interface such as a graphical user interface (GUI) and an operating system (OS) 24 that reside within machine readable media to direct the operation of computer system 20. Any suitable machine-readable media may retain the GUI and OS, such as RAM, ROM, SCSI disk drive, and other disk and/or tape drive (e.g. magnetic diskette, magnetic tape, CD-ROM, optical disk, or other suitable storage media). Also, any suitable GUI and OS may direct the processing unit of the data processing system 20.

Further, computer system 20 preferably includes at least one software application (program product) 26 that resides within machine readable media. The software application may be accessible by an operating system, or may be incorporated into an operating system control program. Preferably, the software application contains instructions that when executed on the processing unit carry out the particular operations of the present invention as described herein.

Referring now to FIG. 2, a high-level block diagram of a server-client based local area network (LAN) is illustrated in accordance with a preferred embodiment of the present invention. The preferred embodiment of the present invention is concerned with the subsequent access or retrieval by a particular client of a file which has been cached within a local client cache. The invention has greatest applicability in a distributed processing environment, but may also apply to basic network systems. Network 201 is comprised of a plurality of client systems, including network computers 203 and workstations 205, all coupled to a central server 211 via an ethernet 209 and connection lines 207. Network 201 also supports remote access to a remote computer 217 via a remote access connector 215. Also illustrated is network printer 213 to which all networked components may send printed output.

Network servers 211 are typically data processing systems having a database, OS, and server software. The server software operates as the brain of a network and provides the support for distributed processing among multiple clients. Client systems/terminals are also typically data processing systems with OS and client software stored locally in memory.

Figure 3A:
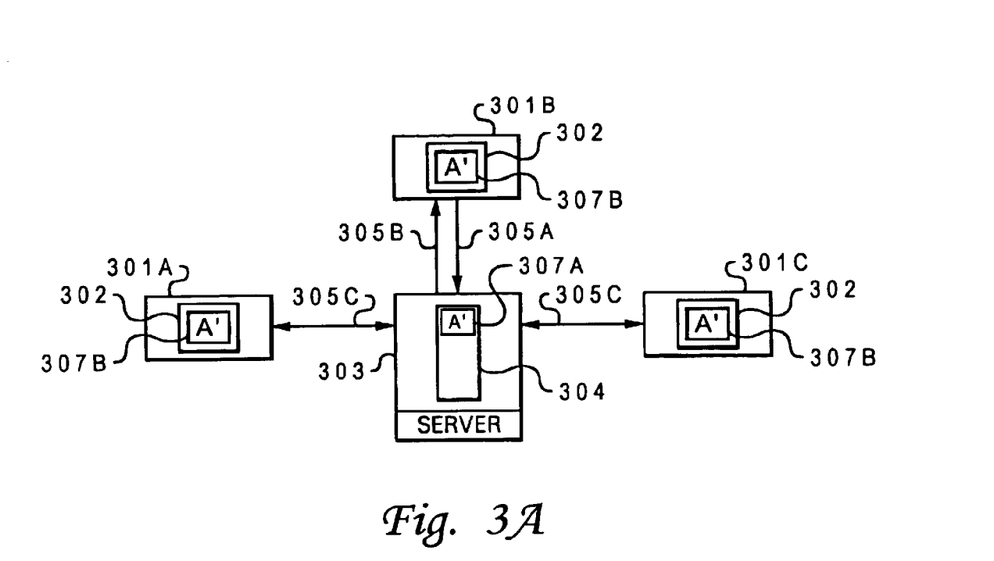
FIGS. 3A and 3B illustrate a client-server configuration with a shared file in a distributed environment, in accordance with a preferred embodiment of the present invention.

Turning now to FIG. 3A, there is illustrated a typical client-server distributed communications module. Client applications 301A–301C sends requests to server application 303 via a request connection 305A. File A 307A is stored on server system 303 within server filesystem 306. Server application 303, in response to the request, transmits the requested file or data back to the client application 301A, 301B, and 301C via a data connection 305B. Request connection 305A and data connection 305B may be a single line connection (or bus) 305C which permits two-way signal or data transmission. The network of FIG. 3A is a distributed network. Each client may load a copy 307B of file A 307A into client cache 302 and operate on (i.e., edit the contents of) copy 307B simultaneously. The server's file A 307A may be updated either by a network manager or by one of the clients 301A–301C. The updated version 307C is stored as file A" as shown in FIG. 3B.

Figure 3B:
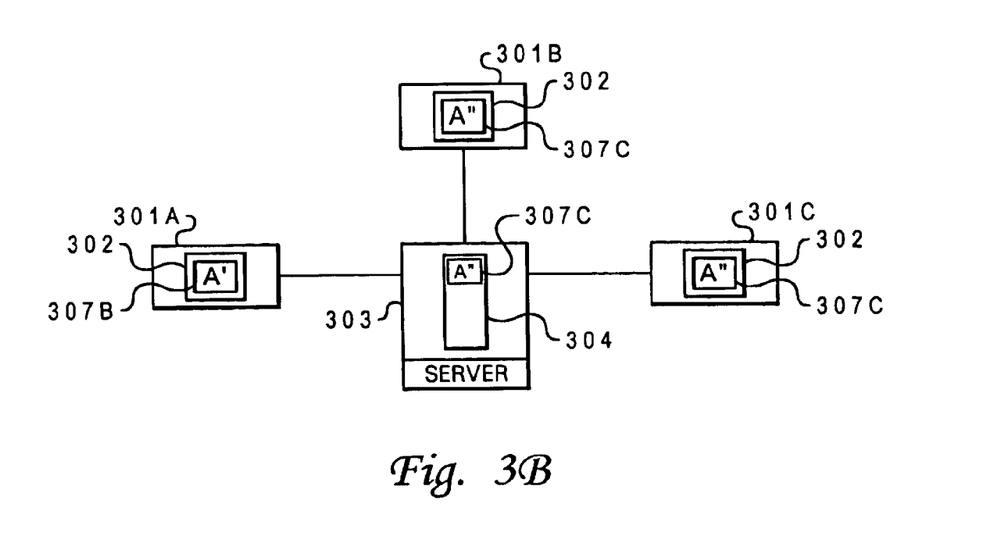

FIG. 3B illustrates the block diagram of FIG. 3A with an updated copy 307C of shared file A 307A loaded on client systems 301B and 301C. Updated copy 307C of file A 307A is depicted within network filesystem 304 on server 303. Copies of updated file 307C are loaded within local cache 302 of clients 301B and 301C having been "downloaded" from network filesystem 304 after shared file A 307 was updated.

As illustrated in FIG. 3B, two of the clients 301B and 301C now display updated copies 307C of file A 307A, which is the current version of the file stored on network filesystem 304. Third client 301A still displays the original copy 307B of File A 301A. The processes by which the files are updated and a client which has a cached copy is alerted of the status of the file are described in detail below with reference to the other figures.

Turning now to FIGS. 4A–4H, there is illustrated an Intranet-based embodiment of the invention. In Intranet-based systems, pages are downloaded unto the client using browser applications and stored in the client cache. These pages can be edited utilizing a web-html editor of the browser. These built in editors are common to the browsers utilized within this particular embodiment. During operation, a user may download a distributed page (i.e., file or document), edit the contents of the page and then over-write the original version of the page on the server with the edited version. A second user of the original version of the page stored in his local cache, would be made aware that his version is a cached version when he opens that page on his browser. FIGS. 4A–4H are block diagram representations of sequential downloading and subsequent cache retrieval of a page (file) in response to user input.

Figure 4A:
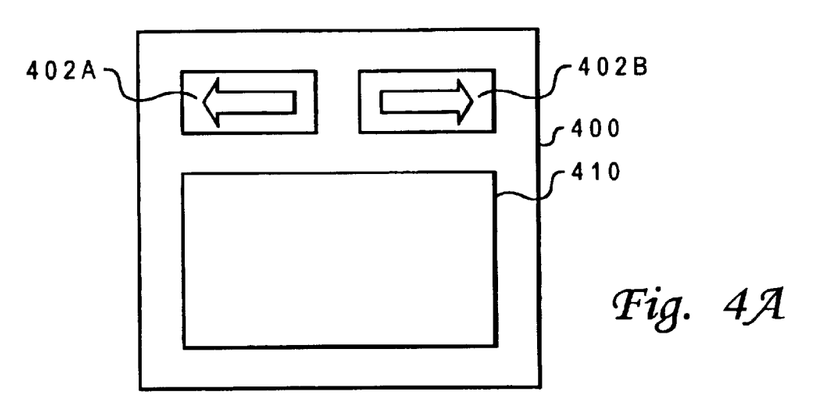
FIGS. 4A–4H are block diagram representations of application GUIs on a client of an Intranet-based network and the process of displaying a newly loaded page and subsequently displaying a cached page in accordance with a preferred embodiment of the present invention.

FIGS. 4A–4H are simplified versions, presented for clarity, of an application GUI such as a browser on the client. Like elements are numbered the same. Also, like elements are not described for the later FIGS. (4B–4F). In FIG. 4A, application window 400 is illustrated having a file area 410 and two scroll/control buttons, back (previous) 402A and forward (next) 402B. Use of these scroll buttons permit a user to return to one of a previously displayed file in a sequential manner, as those skilled in the art are familiar.

Figure 4B:
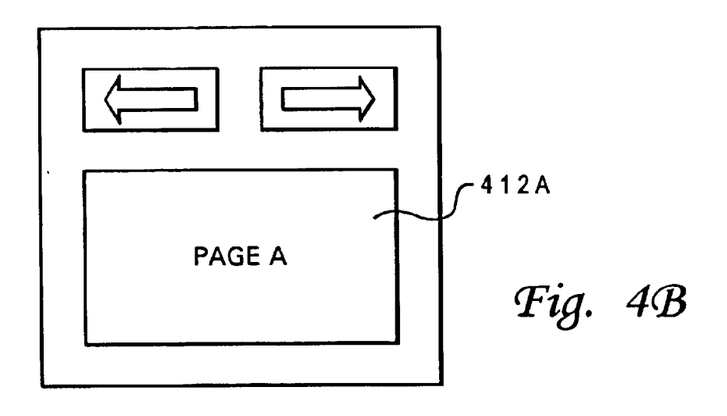
Figure 4C:
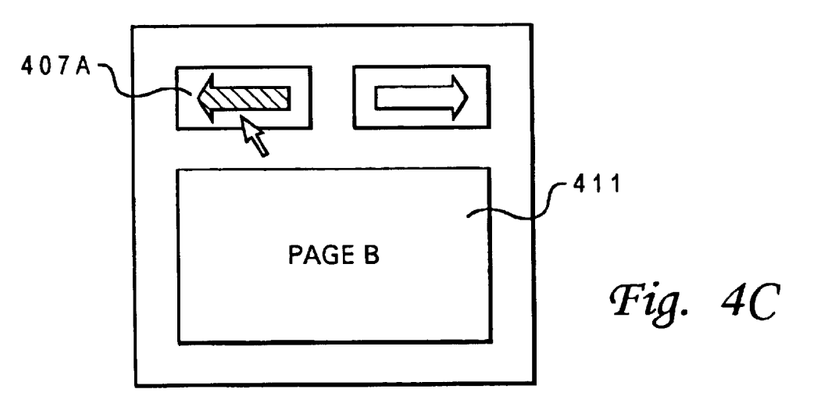
Figure 4D:
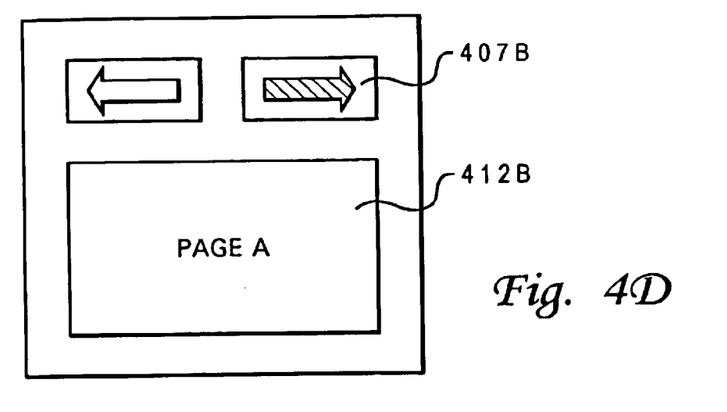
Figure 4E:
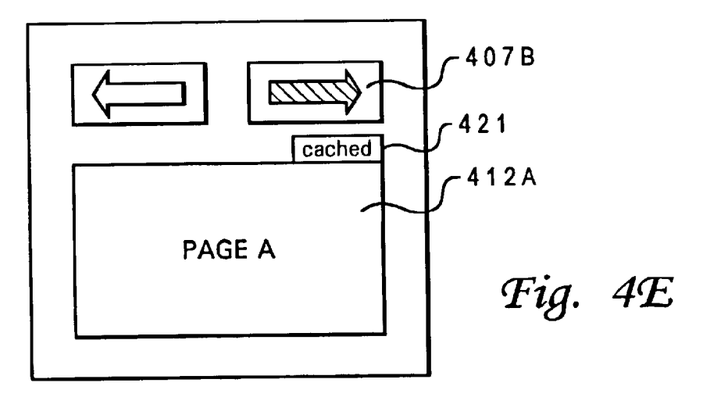
Figure 4F:
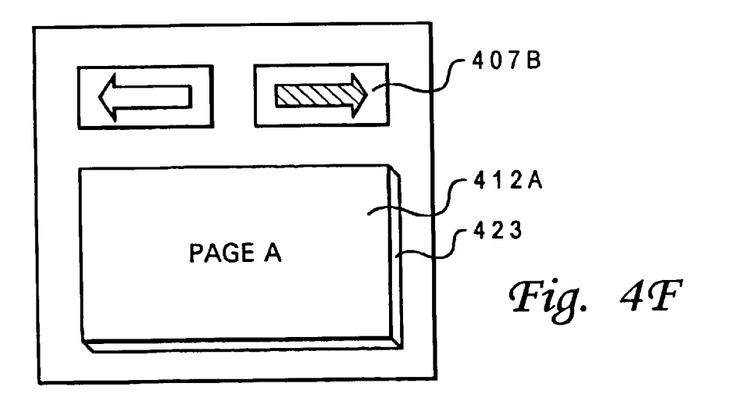

In FIG. 4B, a file A 412A is downloaded from the Intranet (or LAN server) and displayed in file area 410. FIG. 4C illustrates a second file B 411 which has been downloaded from the Intranet. When this occurs, back button 402A is highlighted, indicating to the user that he may return to the first downloaded file A 412A by selecting highlighted back button 407A. Once the second file B 411 is downloaded, the first file is cached (although it may be cached automatically upon its initial download). When the user selects the highlighted return button 407A, one of two events may occur. FIG. 4D illustrates the first event, wherein a newly downloaded version of file 412B is displayed, having been downloaded from the Intranet. FIGS. 4E–4H illustrate four representations of the second event which may occur. Namely, the originally downloaded and now cached file A 412A is displayed having been loaded from the local cache of the client data processing system. When this occurs, one of several methods of alerting the user that the displayed file is the cached file A 412A is utilized. FIG. 4E illustrates a cache indicator 421 atop file A 412A, while FIG. 4F illustrates a shadowing of the borders 423 of file A 412A. In each case where a second file is downloaded, forward button 402B is highlighted to permit user to retrieve second file B 411.

In FIG. 4E a cache indicator 421 is presented within the application window. The cache indicator 421 is displayed only when the file is retrieved from the client cache. Alternatively, it may always be present in the background but only highlighted when necessary. In this way, cache indicator 421 may toggle off for server-loaded files and on for cache-loaded files. Cache indicator 421 may appear over file 410 or in another visible location. It may be displayed as a dialog box prior to displaying the file 410 as described herein, or displayed at predetermined time intervals, during the displaying of file 410. In these embodiments, and subsequent embodiments, a user may be provided with the ability to select the location or method of displaying the cache indicator 421. Thus a user may adjust the settings during application setup or at any time during application execution by entering the "setup" location or menu of the application GUI.

FIG. 4F provides similar functionality as FIG. 4E but utilizes a color-coding or shading scheme to indicate to the user that the page is cached. As seen on FIG. 4F, the borders 423 of the file 412A are shaded, indicating to a user that the file 412A is retrieved from the client cache.

Figure 4G:
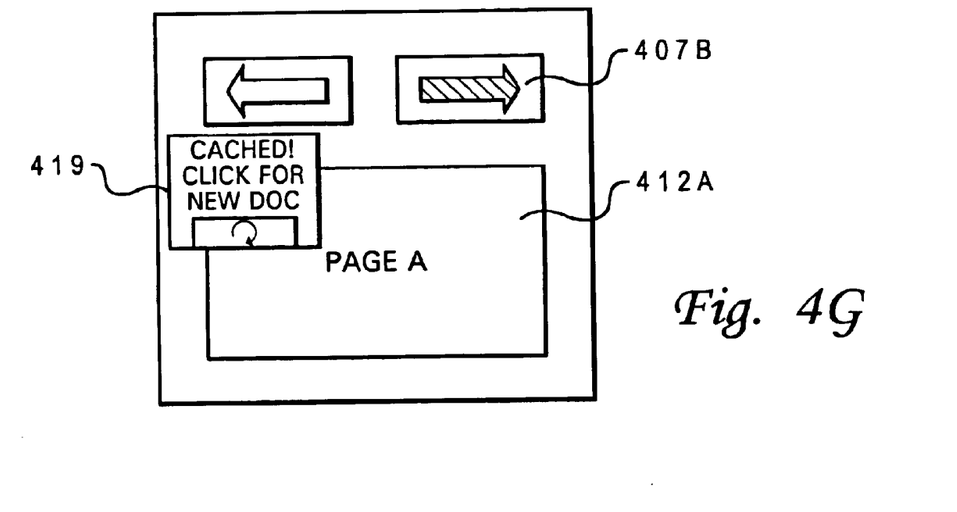
Figure 4H:
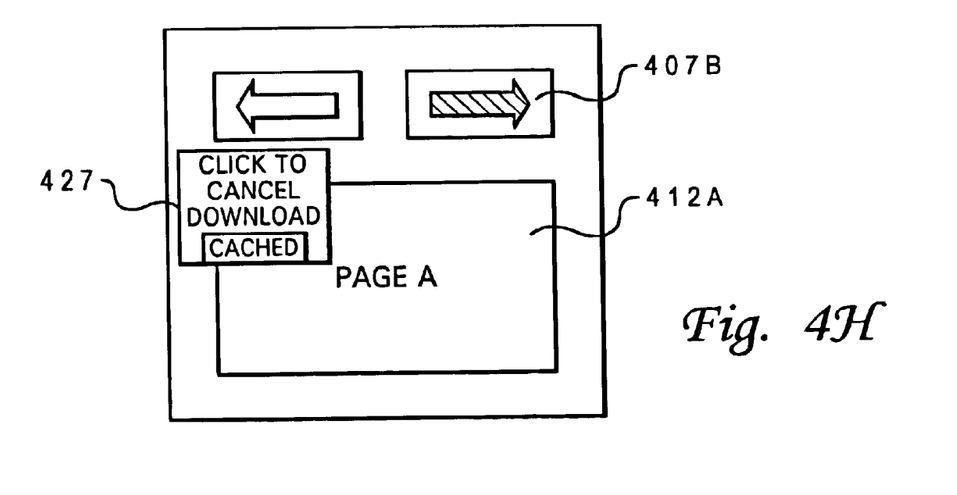

Cache indicator may be a dialog box as in FIG. 4G and 4H wherein a user is not only notified of the cache status of the file but also provided with information explaining the cache indicator message and providing the user with various options, such as, refreshing the file. In the preferred method of this embodiment, illustrated in FIG. 4G, a "reload" button 420 is presented in the dialog box 418. The reload button 420 is linked to the functionality of the open file menu item for accessing a file on the network server and utilizes the same functionalities to enable a reload. Use of the reload button 420 is more convenient in that the user is almost instantaneously reminded to and actually selects the reload button when desired rather than going into the window menu and selecting "open" to open the file from the server.

Although the above illustration assumes the use of the control buttons to re-request the files, it is understood by those skilled in the art that other methods of calling a file address are possible and the invention contemplates all such methods as being fully applicable.

In a second method of the above embodiment illustrated in FIG. 4H, the client may be set to automatically reload the file from the server each time it is accesses. The dialog box 419 then presents the user with an option button 427 to cancel the reload, when the user desires the cached file. Also, it is also contemplated that the indicator/dialog box be used to alert a user when a new file copy is about to be downloaded in situations where the user wishes to access the contents of the cached file or speed up the file retrieval for information which is not time-sensitive. The dialog box 419 indicates that a new copy of the file is about to be downloaded and the user may select the cancel option, which effectuates the retrieval of the cached file. This option would only be present when a cached page exists and the user or client manager has previously set the application window's page request function to retrieve all requests directly from the server.

Although the above embodiment has been presented with reference to an Intranet having pages downloaded into windows having browser type functionality (back and forward buttons and reload button), this embodiment is presented for illustrative purposes only. The invention contemplates a preferred embodiment in which files are loaded into a word processing or similar application (such as a spreadsheet application), wherein a copy of the file is stored in a client cache and later retrieved as discussed herein. Also, the invention finds applicability in networks which utilizes proxy caches to store files for distributed clients. In one such implementation, the user is made aware, not only that he is using a cached copy of the file, but also the location of the cached copy (i.e., either on the local cache or proxy cache).

Figure 5:
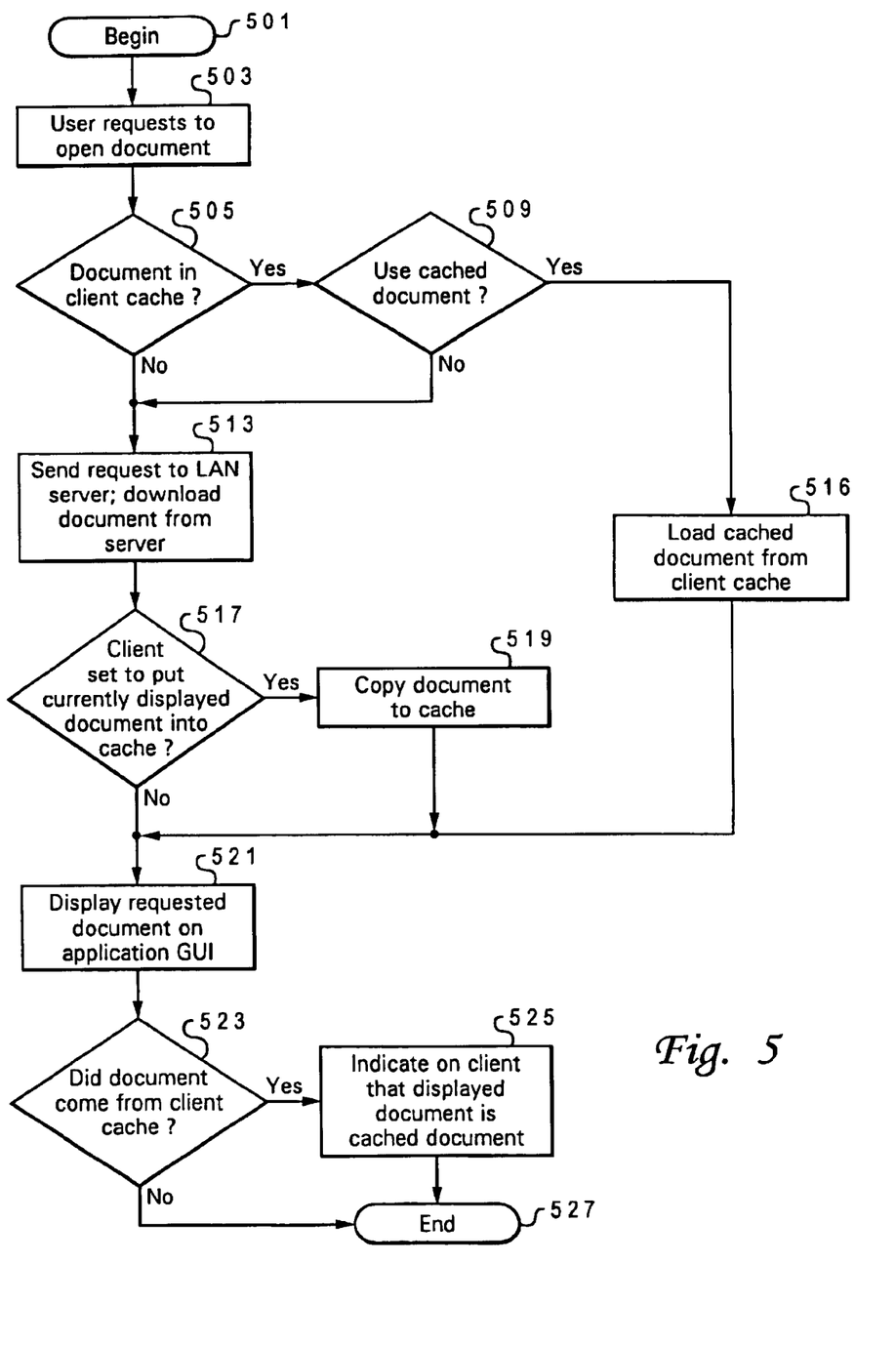
FIG. 5 is a flow chart of the process involved in displaying cache files in accordance with the present invention.

FIG. 5 is a flow chart illustrating the processes of one embodiment of the present invention. The process begins at block 501 when the application is run on the data processing system. The user requests a file at block 503. The request is handled either by a remote server connected to the user data processing system via the Intranet (or LAN) or alternatively by a local cache manager of the data processing system. (i.e., it was previously downloaded and cached). A check is made to determine if the requested file is in the client's cache at block 505. If the file is in the client's cache, the user's preference is read and a determination is made of whether to use the cached file instead of downloading the file from the server at block 509 based on the user's preference. The user's preference may be entered during setup of the client application or host application of the file, or following a prompt to the user prior to retrieving the file. If the cache file is to be used, the processor reads the file from the client's cache at block 516. If, however, the cached file is not to be used (i.e., the requested file is to be loaded from the server), the request is sent to the server and the file downloaded via the LAN at block 513. When a new (i.e., non-cached) file is downloaded, it is automatically stored in the cache unless the user has changed the client application settings. A check is thus made to determine if the client application is set to store newly downloaded file in the client's cache at block 517. When the client application has been set to cache newly downloaded documents, the file is copied to the client's cache at block 519. The requested file is then displayed on the application window at block 521. A final determination of the source of the displayed file is made at block 523, whereby, if the file was retrieved from the cache, an indicator is displayed on the application window at block 525). The user may then select the refresh button to force a download from the server via the Intranet. When a non-cached file is loaded, the cached-file indicator is not displayed. The process then ends at block 527.

In the preferred embodiment, no indication is provided when the file is downloaded from the server. Thus according to the invention, when a cached file is displayed, a visual indicator is used to notify the user that they are reading from a cached file. The user is thus made aware and can hit the "reload" button on the application to cause a new copy of the file to be downloaded from a filesystem of the server. The visual indicator may be, for example, a small colored square that shows up at the bottom corner of a application GUI display area. Alternate methods have previously been discussed.

In another embodiment, a signal is sent to each client which has previously accessed the file, when the file is updated. In this embodiment, the server application keeps track of each client request for a copy from the server and any subsequent updates (e.g., via activation of save command) to the server copy of the file.

In yet another embodiment, the software routine (or program code), which provides the cache indicator functionality includes a subroutine for checking and comparing the copy of the file on the filesystem of the server with the copy on the client. The comparison may be completed with any quickly discernable feature of the files, such as the respective creation dates, file lengths, etc. Thus, when a user opens the file, the comparison subroutine instantaneously accesses the server and compares the selected discernable feature of the file stored on the server's filesystem with the corresponding feature of the locally stored file. When the comparison does not result in a match (e.g., the creation dates of both copies of the files are different—typically, the file in the filesystem has a more recent date if it has been updated), the display of the cached indicator is triggered.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. In a client data processing system connected to a network with a database of files that are shared, a method for displaying a shared file on the client data processing system comprising the steps of:

opening and displaying a copy of said shared file on a display device of said client system;

determining whether said copy is a cached copy of said shared file that is stored within a client-cache; and indicating, along with a display of said shared file, a location from which the shared file was opened, wherein;

when said copy is a cached copy, said shared file is displayed with an indicator that said shared file being displayed is a cached copy that was opened from the client-cache and not a server copy opened from the network.

2. The method of claim 1, wherein said determining step includes the step of checking whether said copy was loaded from the client-cache.

3. The method of claim 1, wherein said determining step includes the step of comparing a server copy of said shared file within said database with said cached copy to determine if said cached copy and said server copy are different.

4. The method of claim 3, wherein:

said determining step includes the step of tagging each update to said file as a different version, wherein said file is updatable by both said client and a network server; and said comparing step includes the step of comparing versions of said document on said network database and said client-cache, respectively, wherein said copies are different if said versions are not equal.

5. The method of claim 4, further comprising the steps of:

automatically retrieving a version of said file that is a most current version, wherein said file is retrieved from said network database when a server-version of said file is newer than a client-version and vice-versa; and providing a user-option allowing a user to select to display said cached copy when said server-version of said file is newer than that of said cached copy.

6. The system of claim 3, wherein:

said determining means includes means for tagging each update to said file as a different version, wherein said file is updatable by both said client and a network server; and said comparing means includes means for comparing versions of said shared file on said network database and said client-cache, respectively, wherein said copies are different if said versions are not equal.

7. The system of claim 6, further comprising:

means for automatically retrieving a version of said file that is a most current version, wherein said file is retrieved from said network database when a server-version of said file is newer that a client-version and vice-versa; and means for providing a user option allowing a user to select to display said cached copy when said server-version of said file is newer than that of said cached.

8. The method of claim 1, wherein said indicating step further includes the step of visually displaying said indicator.

9. The method of claim 1, wherein said indicating step includes the step of providing an audible indicator.

10. The system of claim 1, wherein said determining means includes means for checking whether said copy was loaded from the client-cache.

11. In a client data processing system connected to a network with a database of files that are shared, a modified client application running on the data processing system comprising:

means for opening and displaying a copy of a file on a display device of said client system;

means for determining whether said copy is a cached copy of said shared file that is stored within a client-cache; and means for indicating along with a display of said shared file, a location from which the shared file was opened, wherein when said copy is a cached copy, said shared file is displayed with an indicator that said shared file being displayed is a cached copy that was opened from the client-cache and not a server-copy opened from the database of the network.

12. The system of claim 11, wherein said determining means includes means for comparing a server copy of said file within said database with said cached copy to determine if said server copy and said cached copy are different.

13. The system of claim 12, wherein said automatically indicating means further includes means for visually displaying an indicator.

14. The system of claim 12, wherein said indicating means includes means for providing an audible indicator.

15. A computer program product for indicating a cache status of a shared file displayed on a client system coupled to a network, said program product comprising:

a computer readable storage medium;

program instructions stored on said storage medium for:

caching files loaded from a server on said network into a client system cache;

opening and displaying a copy of said shared file on a display device of said client system;

determining whether said copy is a cached copy of said shared file that was loaded from a client-cache of said client system; and indicating along with a display of said shared file, a location from which the shared file was opened, wherein, when said copy is a cached copy, said shared file is displayed with an indicator that said shared file being displayed is a cached copy that was opened from the client-cache and not a server copy opened from the network.

16. The program product of claim 15, wherein said program instructions for said determining step includes program instructions for checking whether said copy was loaded from the client-cache.

17. The program product of claim 15, wherein said program instructions for said determining steps includes program instructions for comparing a server copy of said shared file within said database with said cached copy to determine if said cached copy is a different version of said shared file.

18. The program product of claim 17, wherein:

said program instructions for said determining step includes program instructions for tagging each update to said file as a different version, wherein said file is updatable by both said client and a network server; and said program instructions for said comparing step includes the step of comparing versions of said shared file on said network database and said client-cache, respectively, wherein said copies are different if said versions are not equal.

19. The program product of claim 18, further comprising;

program instructions for automatically retrieving a version of said file that is a most current version, wherein said file is retrieved from said network database when a server-version of said file is newer that a client-version and vice-versa; and program instructions for providing a user option allowing a user to select to display said cached copy when said server-version of said file is newer than that of said cached copy.

20. The program product of claim 15, wherein said program instructions for said indicating step further includes program instructions for visually displaying an indicator.

21. The program product of claim 20, wherein said program instructions for said indicating step further includes program instructions for providing an audible indicator.

\* \* \* \* \*